US006516252B2

(12) United States Patent
Suzuki et al.

(10) Patent No.: US 6,516,252 B2
(45) Date of Patent: Feb. 4, 2003

(54) METHOD FOR ACQUIRING SATELLITE

(75) Inventors: Michihiko Suzuki, Tokyo (JP); Toru Okanuma, Tokyo (JP); Tomomi Murakami, Tokyo (JP); Yurika Hirano, Tokyo (JP); Takako Kouti, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/745,547

(22) Filed: Dec. 26, 2000

(65) Prior Publication Data

US 2002/0052676 A1 May 2, 2002

(30) Foreign Application Priority Data

Jun. 30, 2000 (JP) ....................................... 2000-198215

(51) Int. Cl.[7] .................................................. G06F 7/00

(52) U.S. Cl. ......................... 701/13; 701/213; 701/225; 701/226; 342/357.06; 342/357.07

(58) Field of Search .......................... 701/13, 213, 215, 701/225, 226; 342/357.03, 357.06, 357.07, 357.15, 358, 359; 455/12.1

(56) References Cited

U.S. PATENT DOCUMENTS 4,355,313 A * 10/1982 Hubert
4,358,767 A * 11/1982 Boireau
4,675,680 A * 6/1987 Mori
4,687,161 A * 8/1987 Plescia et al.
4,883,244 A * 11/1989 Challoner et al.
5,043,737 A 8/1991 Dell-Imagine .............. 342/358
6,078,286 A 6/2000 Gonzales et al. ........... 342/359

FOREIGN PATENT DOCUMENTS

WO WO 99/45659 9/1999

OTHER PUBLICATIONS

Derwent Publications Ltd., Geostationary Satellite Tracking Aerial Control, Oct. 10, 1979.

Patent Abstracts of Japan, JP 10–020010, Jan. 23, 1998.

Patent Abstract of Japan, JP 9–284033, Oct. 31, 1997.

G. J. Hawkings, et al., IEE Proceedings, vol. 135, Pt. F, No. 5, pp. 393–407, "Tracking Systems for Satellite Communications", Oct. 1988.

* cited by examiner

*Primary Examiner*—Gertrude Arthur
(74) *Attorney, Agent, or Firm*—Oblon, Spivak, McClelland, Maier & Neustadt, P.C.

(57) ABSTRACT

A method for acquiring a satellite using satellite prediction values has a behavior analysis step for analyzing a behavior unique to a satellite orbit, a search range calculation step for calculating a search range based on the analysis, and a search step for searching ranges in accordance with the predicted values.

11 Claims, 7 Drawing Sheets

METHOD FOR ACQUIRING SATELLITE

BACKGROUND OF THE INVENTION

1. Field of the Invention

The present invention relates to a method for acquiring a satellite, in particular to a method for acquiring a satellite, which allows reduction in search time and efficient searches in acquiring orbiting objects such as artificial satellites and space debris.

2. Description of the Related Art

In order to communicate with an artificial satellite, the satellite must first be acquired by an antenna. Generally, the antenna is driven in accordance with predicted values (azimuth or elevation angle) obtained based on orbital calculations for the acquisition.

Also, in acquisition at the launch of an artificial satellite, there are no predicted values based on orbital calculations. Thus, target orbital factors from the launch of the rocket are used instead.

However, the conventional method for acquiring a satellite using such predicted values involves errors in the predicted values. That is, according to the orbital calculation, it is impossible to accurately predict the amount of orbital degradation due to atmospheric resistance, which results in errors in predicted values.

Also, the method causes errors due to launch precision in addition to atmospheric resistance when lofting the artificial satellite into orbit.

Accordingly, in the method for acquiring a satellite by using such predicted values, the antenna needs to be basically directed in a direction based on predicted values, but also to be adjusted by performing some further search or operations.

Conventionally, accurate and fast satellite search, in consideration of such errors, can be achieved by virtually increasing the beam width of the antenna.

One of these methods is to provide a search mode as a drive mode for the antenna. This is a method for searching a region of expected maximum displacements with respect to rapidly changing predicted values by moving the antenna in a circle, a rectangle, or a zigzag.

Another method is accomplished by additionally building a small acquisition antenna having a beam in parallel with a main antenna beam. When an antenna with higher gain and thinner beam requires too much time for searches in the search mode, possible acquisition failures may result. Thus, this is a method for acquisition using an acquisition antenna with wider beams.

With the increase in antenna aperture or operational frequency in accordance with the increase in communication data rate, the antenna beams have become progressively narrow. On the other hand, since the deviation of orbits occurs without any relationship to frequencies and/or antenna beam width, the search range over which the antenna must scan relatively increased.

The acquisition antenna obtains lower gains and cannot have a larger effective aperture (wider beams) at a radio strength in accordance with a main antenna. Increases in effective aperture increase costs.

SUMMARY OF THE INVENTION

The present invention was made in order to overcome the above problem. Accordingly, it is an object of the present invention to provide a method for acquiring a satellite, which allows reduction in search time without increasing the effective aperture of the antenna by analyzing a satellite orbit from an acquisition viewpoint and narrowing the search range. Furthermore, it is an object of the present invention to provide a method for acquiring a satellite including precise measurements of the amounts of orbital errors at a level without any operational problems for easier satellite tracking thereafter.

A method for acquiring a satellite by using predicted values for a satellite according to an aspect of the present invention includes the steps of analyzing a behavior unique to a satellite orbit, calculating a search range based on the analysis, and searching the search range in accordance with the forecast value.

The satellite may be an artificial satellite, and the step for analyzing a behavior may include the step of analyzing a behavior unique to an orbit of the artificial satellite.

The "satellite" may be space debris, and the step for analyzing a behavior may include the step of analyzing the behavior of an orbit of space debris.

Furthermore, the forecast value may be corrected in consideration of the movement of an earth station due to the earth's rotation.

In this case, a search range and a search speed may be determined arbitrary by using a corrected time amount used for correction calculation of the predicted value as a parameter for the search.

Furthermore, the search preferably includes horizontal and orbital plane searches within the search range.

Also, the method for acquiring a satellite may further include the steps of using a corrected time amount as a parameter for a correction calculation, detecting an optimum value of the parameter and fixing the parameter to the optimum value after a determination signal reaches a predetermined value.

Preferably, the method for acquiring a satellite further includes the steps of using an antenna angle error signal as the determination signal, and fixing the parameter to the optimum value after the antenna angle error signal is at a minimum.

Furthermore, the method for acquiring a satellite may further include the steps of using a receiving level of a receiver as the determination signal, and fixing the parameter to the optimum value after the antenna angle error signal is at a maximum.

In addition, the method for acquiring a satellite may further include the steps of calculating orbital factors to calculate predicted values and using an Epoch time of the orbital factors as a parameter for correction calculation.

Preferably, the method for acquiring a satellite further includes the steps of sending the calculated parameter for correction calculation to another earth station, which in turn corrects the predicted values by using the received parameter so as to search for the artificial satellite.

In accordance with the present invention, the search range is narrowed so that the search time can be reduced. A small antenna for acquisition does not need to be installed, which can reduce maintenance costs. Since the acquisition is not performed with a small antenna, it can be used for satellite acquisition using micro-power. Furthermore, the analysis of the behavior unique to the artificial satellite orbit provides an accurate search range with respect to the artificial satellite orbit, which can further reduce the search time. Also, the analysis of the behavior unique to the space debris orbit provides an accurate search range with respect to the artificial satellite orbit, which can further reduce the search time. In accordance with the present invention, correct predicted values can be obtained so that a satellite can be reliably acquired. Also, accurate satellite searches can be performed. After the parameter is fixed to an optimum value, the satellite search at steady state can be performed accurately. In this case, the parameter can be fixed to the optimum value by using a simple method. In addition, a parameter calculated based on an observation at one station can be used at the other earth station, which in turn can acquire a satellite in accordance with a corrected predicted value without any search.

DESCRIPTION OF THE PREFERRED EMBODIMENTS

Behavior of Satellite Orbit from Viewpoint of Acquisition

Gravitational influences of the earth, moon, sun, and planets do not cause errors in predicted values which influence acquisition even though there are only small differences among simulation. On the other hand, factors which cannot applied to calculations are resistance of the earth Earth's atmosphere and lift. However, those factors can be generally estimated and errors caused thereby are slight.

However, slight errors in the longitudinal radius can become significant tangential displacements of the orbit after predicted revolutions. After one week, the displacement is often more than several tens of degrees (several minutes in time) viewed from the earth station.

That is, errors in predicted values for a satellite whose orbit is determined once ("steady state" hereinafter) is slight in the direction perpendicular to the direction the satellite travels and is not greater than the beam width of the antenna. However, the error displacement in the travelling direction sometimes exceeds the beam width of the antenna significantly (behavior analysis step).

Further, "at launch", the prediction can be done based on rocket target orbital factors even before the orbit is determined. In this case, a displacement due to a launch error is superimposed on an error at the steady state. Thus, the error in the satellite travelling direction becomes larger than that at the steady state, and the amount of the displacement in the perpendicular direction is not negligible. In this case, the displacement in the perpendicular direction does not increase with a lapse of time and ranges within certain values (behavior analysis step).

First Embodiment

Figure 1:
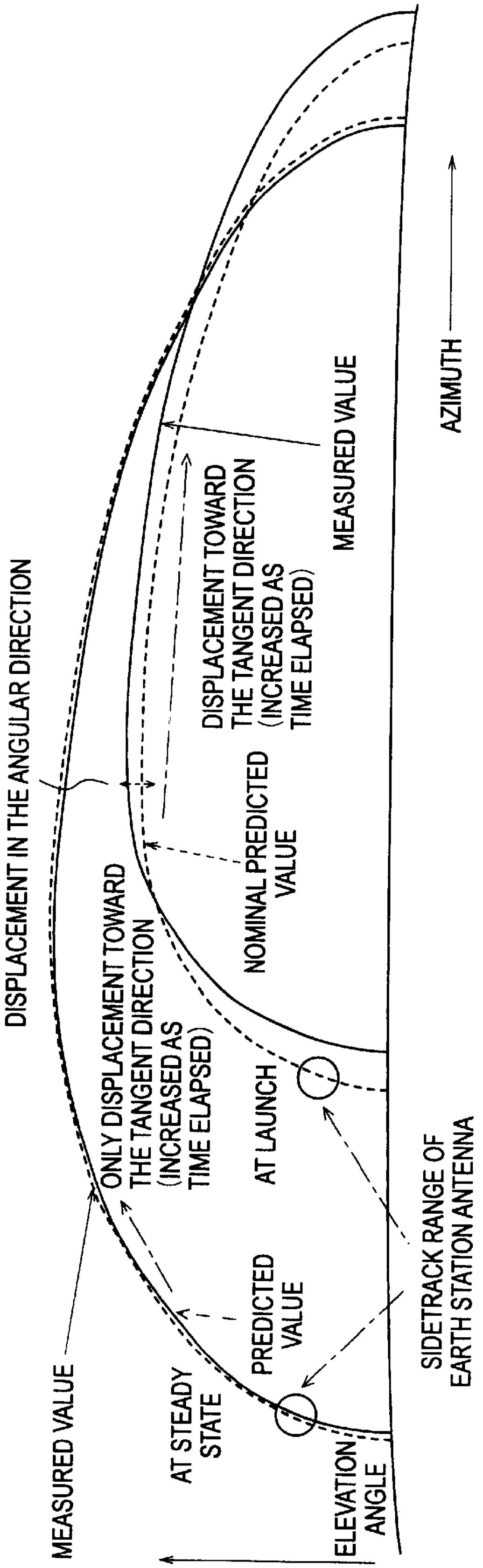
FIG. 1 is a diagram for describing how a satellite orbit is displaced from the viewpoint of a ground antenna without any consideration of the movement of the earth station (the Earth's rotation)

FIG. 1 shows schematically how orbits are displaced between at the steady state and at launch in a case where a earth station does not move (that is, the earth's rotation is not considered) in the azimuth/elevation angle viewing from an earth station antenna.

As described in the Behavior of Satellite Orbit From Viewpoint of Acquisition, it is found that the displacement of a satellite orbit is limited in a certain direction as a result of research (behavior analysis step). Thus, it eliminates the need for a conventional wide range search in which an antenna is scanned over a wide range, and only a search along the orbit is required (search range calculation step, search step). This is shown in FIGS. 2 and 3.

Figure 2:
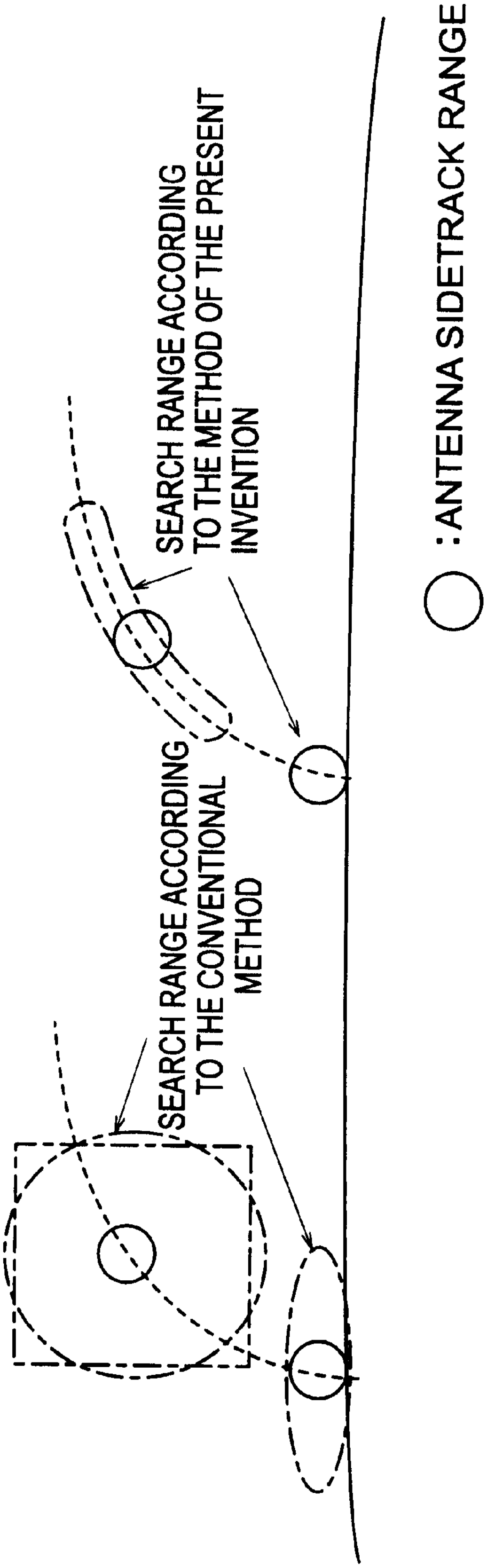
FIG. 2 is a diagram showing a comparison between a searching method at a steady state and a conventional method.

FIG. 2 shows a comparison between a search method according to this embodiment and a conventional method in the steady state, and shows both horizontal search whereby a satellite is acquired when it appears over the horizon (that is, when the elevation angle is low) and orbital plane search whereby it is acquired when the elevation angle is high, respectively. On the other hand, FIG. 3 shows a comparison between a search method according to this embodiment and a conventional method at launch, and shows both horizontal search whereby a satellite is acquired when it appears over the horizon (that is, the elevation angle is low) and orbital plane search whereby it is acquired when the elevation angle is high, respectively.

Figure 3:
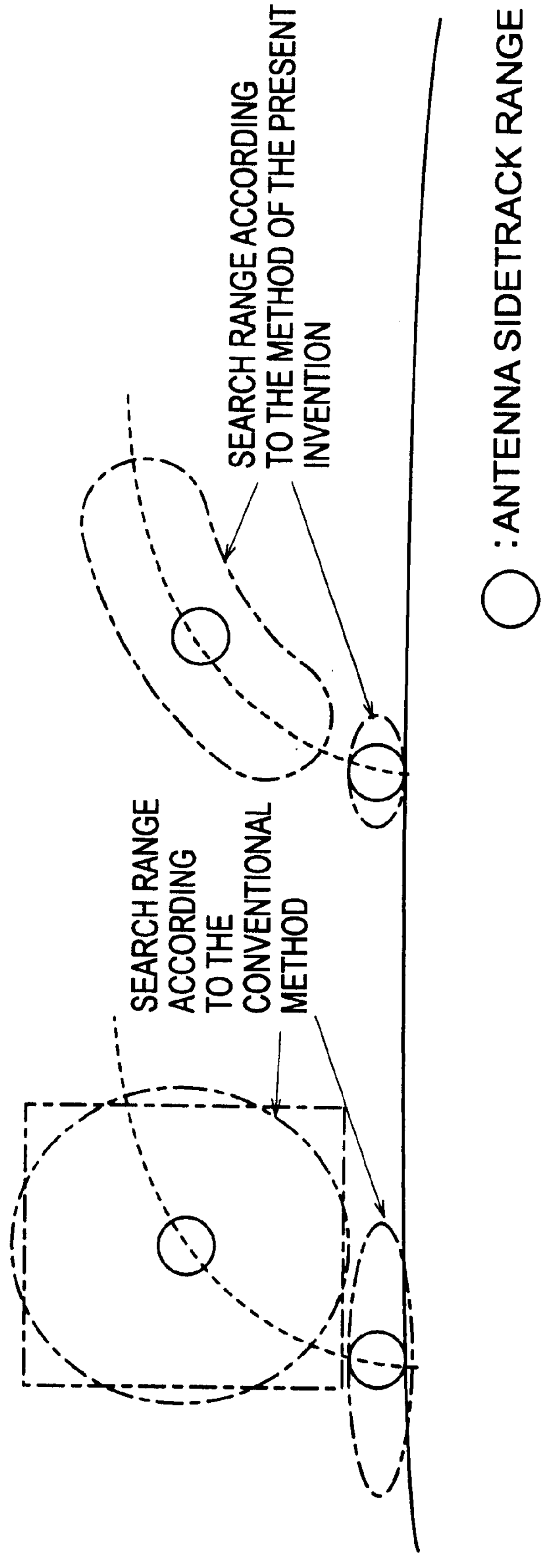
FIG. 3 is a diagram showing a comparison between a searching method at launch and a conventional method.

The movement of the earth station is not considered in FIGS. 2 and 3. Thus, in order to implement this search, predicted values must be corrected by taking the earth station movement due to the earth's rotation into consideration.

For Reducing Search Time by Minimization of Search Range

Figure 4:
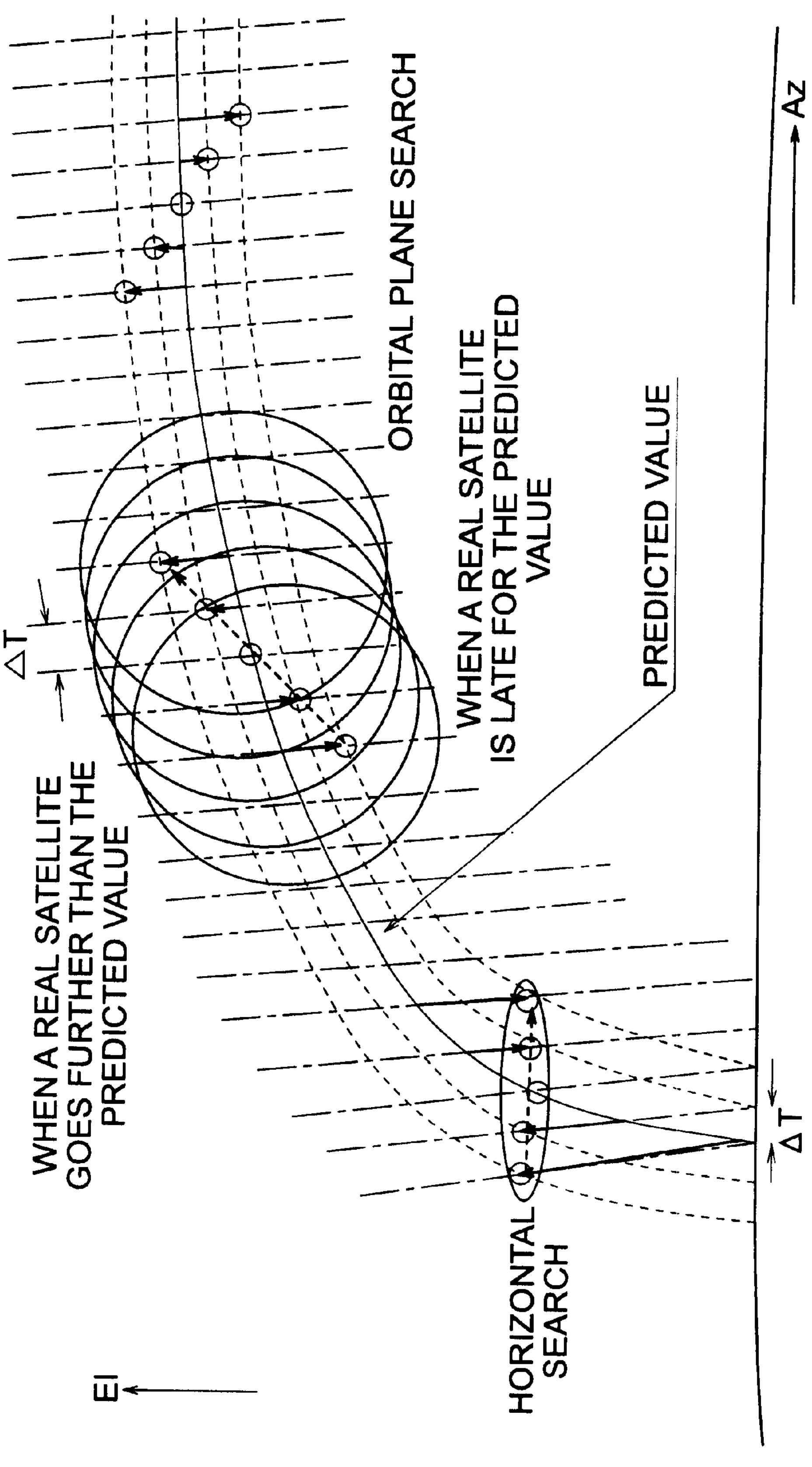
FIG. 4 is a diagram showing an image according to a acquiring method in consideration of movement of a earth station at a steady state.

FIG. 4 shows the search range shown in FIG. 2 by taking the Earth's rotation into consideration. That is, FIG. 4 is a view based on the acquisition method according to this embodiment by taking the earth station movement at the steady state into consideration. It shows changes in azimuth/elevation angle viewing from a earth station moved by the Earth's rotation and illustrates the search method in a more practical form.

In FIG. 4, a solid line indicates predicted values and intervals divided by single dotted dashed lines indicate intervals between predicted values (ΔT). In FIG. 4, dotted lines indicate variations in view from the earth station with the earth's rotation between errors in predicted values, if any, by using predicted intervals (±ΔT and ±2ΔT). That is, positions of small circles represent predicted values corrected when an orbit error is ±ΔT, ±2ΔT.

Accordingly, the search range at the steady state as shown in FIG. 2 may be searched in one direction along these circles over time (indicated by an arrow on a thick doted line). For reference purposes, the search ranges according to the conventional method are shown by thick line circles (orbital plane search) and an oval (horizontal search). Conventionally, the range must be totally searched in a circular or rectangular search mode, for example (mode where an antenna is scanned over the area to be searched).

Figure 5:
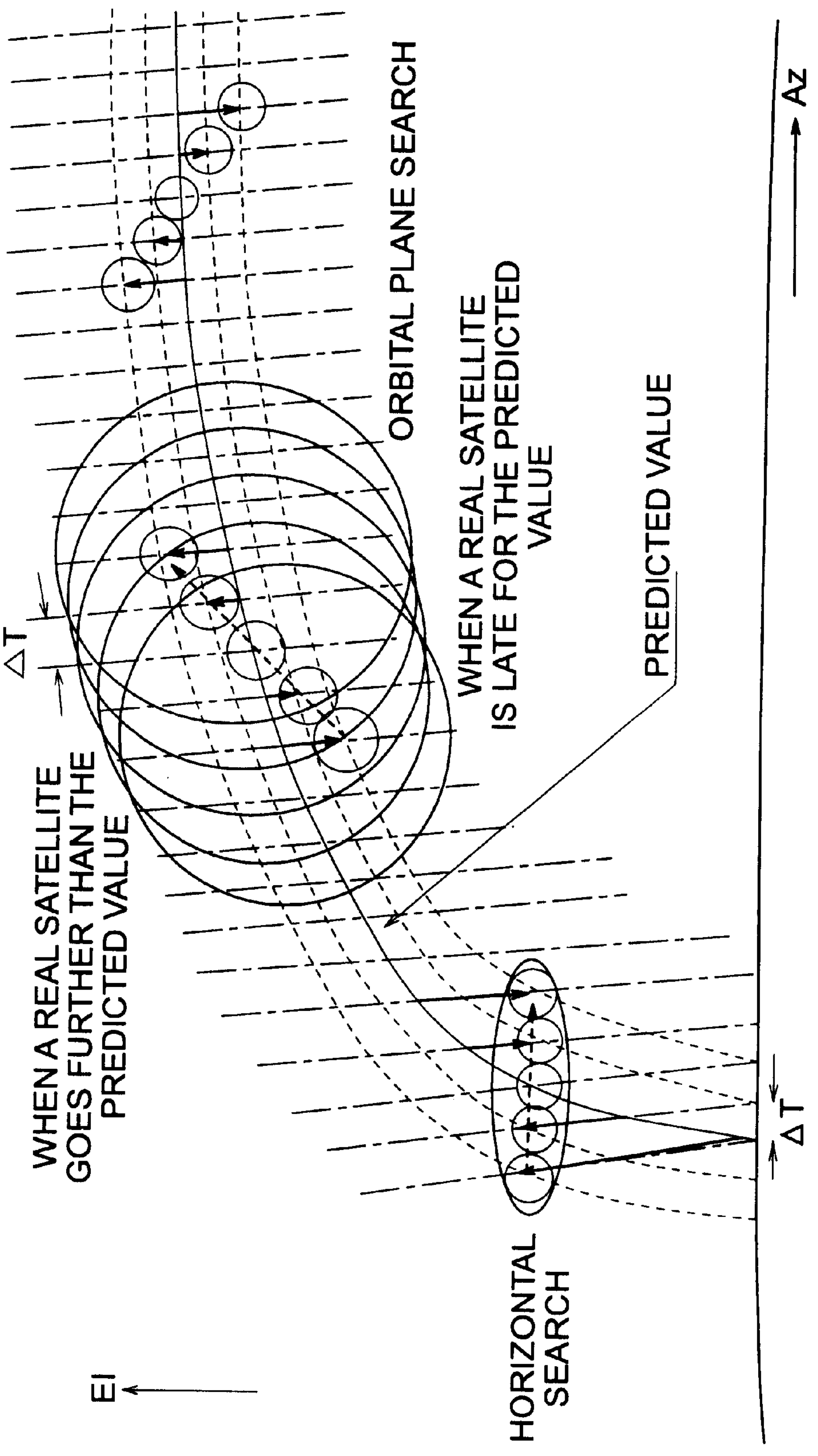
FIG. 5 is a diagram showing an image according to an acquiring method in consideration of movement of an earth station at launch.

The search range at launch shown in FIG. 3 is wider by an amount equal to a maximum estimated displacement of an orbit caused by the launching error. The search mode is superimposed thereon when the search width is greater than the beam width. This image is shown in FIG. 5. FIG. 5 shows changes in satellite azimuth/elevation angle viewing from an earth station moved by the earth's rotation and represents the search method in a more practical form.

Second Embodiment

Figure 6:
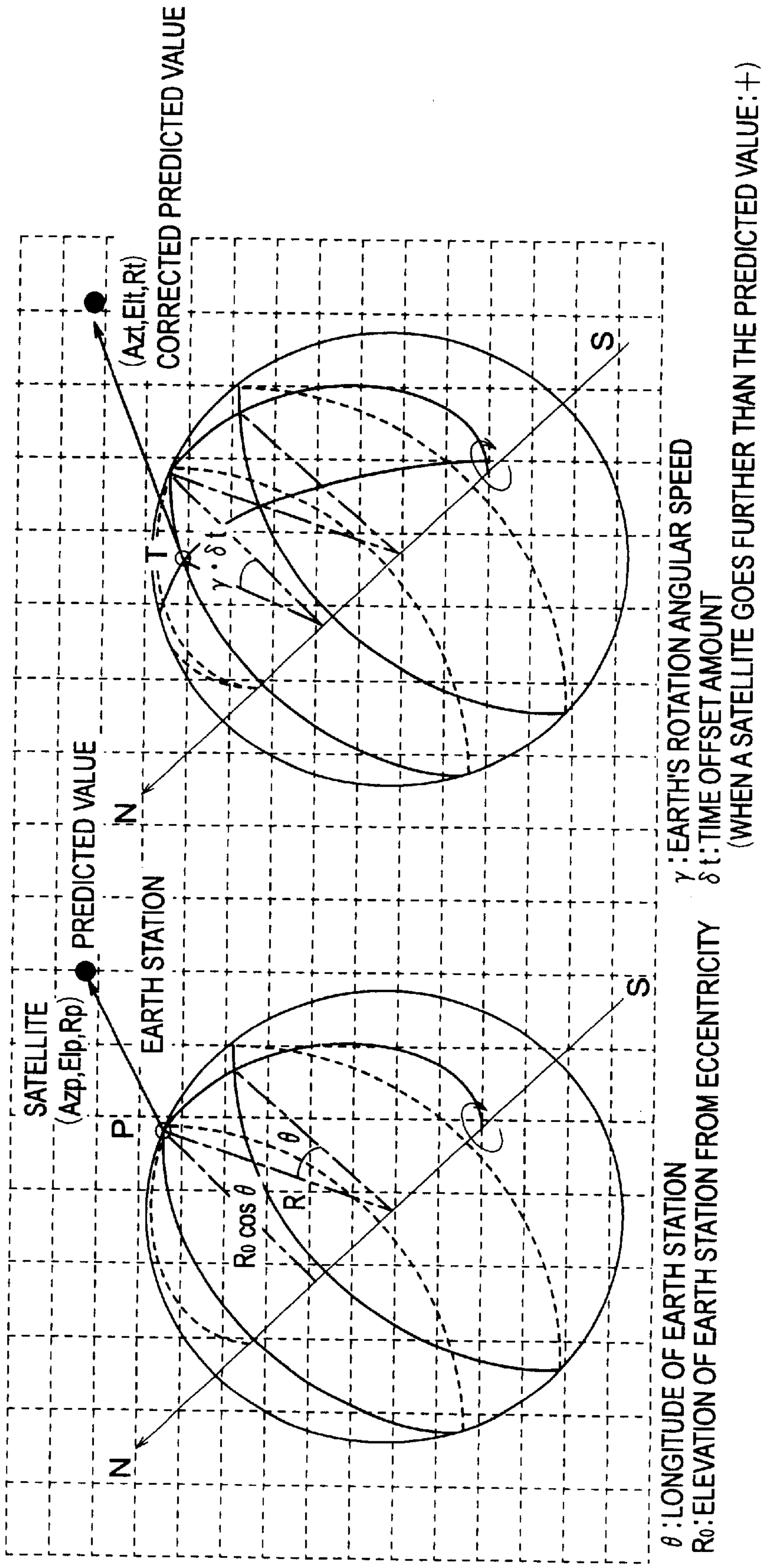
FIG. 6 is a diagram for describing a relationship used for deriving a predicted value correction formula.

Easy Correction of Predicted Values in View of Earth Station Movement due to Earth's Rotation Corrected predicted values are calculated by repeating coordinate conversions. Table 1 shows definitions of a coordinate system. FIG. 6 shows a relational explanatory diagram thereof. In FIG. 6, a satellite position is fixed, and movements of an earth station (observation point/coordinate origin) by the earth's rotation are shown (the earth is closely approximated by a sphere, here). Furthermore, one example of conversion equations is shown in Table 2.

TABLE 1

COORDINATE SYSTEM USED FOR CONVERSIONS

| | COODINATE SYSTEM | 1ST AXIS | 2ND AXIS | 3RD AXIS | REMARKS |
|---|---|---|---|---|---|
| 1 | Azp, Elp, Ep | AZIMUTH | ELEVATION ANGLE | DISTANCE | PREDICTED VALUE AT TIME TP AND POINT P |
| 2 | X1, Y1, Z1 | EAST | NORTH | ZENITH | EARTH'S SURFACE COORDINATE AT POINT P |
| 3 | X2, Y2, Z2 | EAST | NORTH | ORTHOGONAL TO EARTH'S AXIS | EARTH'S AXIS PARALLEL COORDINATE Y AXIS AT P POINT IS PARALLEL TO EARTH'S AXIS |
| 4 | X3, Y3, Z3 | EAST (AT P POINT) | NORTH | ORTHOGONAL TO EARTH'S AXIS | ORIGIN'S PARALLEL MOVEMENT ALONG WITH EARTH'S ROTATION FROM P POINT TO POINT T |
| 5 | X4, Y4, Z4 | EAST | NORTH | ORTHOGONAL TO EARTH'S AXIS | ROTATION EQUAL TO EARTH'S ROTATION AT POINT T ABOUT EARTH'S AXIS PARALLEL COORDINATE Y-AXIS |
| 6 | X5, Y5, Z5 | EAST | NORTH | ZENITH | EARTH'S SURFACE COORDINATE AT POINT T |
| 7 | Azt, Elt, Et | AZIMUTH | ELEVATION ANGLE | DISTANCE | TIME TP-δT, PREDICTED VALUE AT POINT T |

TABLE 2

PREDICTED VALUE CORRECTION EQUATIONS
INPUT) EARTH STATION ELEVATION (EARTH'S CENTER DISTANCE: $R_a$ PREDICTED VALUE AZIMUTH; Azp ELEVATION ANGLE:Elp DISTANCE:Rp EARTH STATION LATITUDE (NORTHERN LATITUDE: +) DISPLACED TIME/CORRECTED TIME AMOUNT (FASTER: +): δT $$\begin{vmatrix} X1 \\ Y1 \\ Z1 \end{vmatrix} = Rp \begin{vmatrix} \cos Elp \cdot \sin Azp \\ \cos Elp \cdot \cos Azp \\ \sin Elp \end{vmatrix}$$

$$\begin{vmatrix} X2 \\ Y2 \\ Z2 \end{vmatrix} = \begin{vmatrix} 1 & 0 & 0 \\ 0 & \cos\theta & \sin\theta \\ 0 & -\sin\theta & \cos\theta \end{vmatrix} \times \begin{vmatrix} X1 \\ Y1 \\ Z1 \end{vmatrix}$$

$$\begin{vmatrix} X3 \\ Y3 \\ Z3 \end{vmatrix} = \begin{vmatrix} X2 \\ Y2 \\ Z2 \end{vmatrix} + R_a\cos\theta \begin{vmatrix} \sin\gamma \cdot \delta t \\ 0 \\ 1 - \cos\gamma \cdot \delta t \end{vmatrix}$$

$$\begin{vmatrix} X4 \\ Y4 \\ Z4 \end{vmatrix} = \begin{vmatrix} \cos\gamma \cdot \delta t & 0 & \sin\gamma \cdot \delta t \\ 0 & 1 & 0 \\ -\sin\gamma \cdot \delta t & 0 & \cos\gamma \cdot \delta t \end{vmatrix} \times \begin{vmatrix} X3 \\ Y3 \\ Z3 \end{vmatrix}$$

$$\begin{vmatrix} X5 \\ Y5 \\ Z5 \end{vmatrix} = \begin{vmatrix} 1 & 0 & 0 \\ 0 & \cos\theta & -\sin\theta \\ 0 & \sin\theta & \cos\theta \end{vmatrix} \times \begin{vmatrix} X4 \\ Y4 \\ Z4 \end{vmatrix}$$

Azt = π/2-Arctan (Y5/X5) :WHEN X5 IS POSITIVE
Azt = 3π/2-Arctan (Y5/X5) :WHEN X5 IS NEGATIVE
Azt = π/2 :WHEN X5=0 AND Y5: POSITIVE
Azt = 3π/2 :WHEN X5=0 AND Y5: NEGATIVE
Elt = Arctan (Z5/(X52 + Y52) **0.5)
Rt = (X52 + Y52 + Z52) 0.5

In this embodiment, the precision required for an earth station elevation (geocentric distance) is related to the precision of a predicted value on which it is based. However, an error of several kilometers does not generally affect the result very much. The distance between a satellite and an earth station is also the same among used predicted values (the earth-sphere approximation).

When a precision beyond 0.1 degree is required in the azimuth and the elevation angle, the Earth must be approximated as an oblate spheroid.

Third Embodiment

A search range and a search rate are determined for the satellite search by using as a parameter a correcting time amount δt used for correction calculations.

Horizontal Search (waiting at an elevation angle E1=E1m):

When estimated maximum displaced times are δts (before a predicted time) and δte (after a predicted time), a waiting azimuth is obtained by using the correction formula from δts before a predicted time. Since the azimuth varies at correction, a predicted time, azimuth and distance when the elevation angle is close to E1m are found from the predicted values to correct them by using a correction parameter as −δts. Then, a predicted value (predicted time, azimuth, elevation angle, distance) close to the elevation angle obtained therefrom is readout and corrected by using a correction parameter +δts in order to obtain a corrected predicted value δts before the predicted time.

The horizontal search is accomplished by repeating the operation above from +δts to −δts where δts is reduced by predicted time interval ΔT. The searching time results in (δts+δte).

Orbital Plane Search:

Unlike the horizontal search, a satellite moving over time is searched for by an orbital plane search. Thus, there are two search methods: One is a search by tracking a satellite along an orbital plane after a predicted time (the direction of arrows in FIGS. 4 and 5); and the other is a search by forestalling and facing to the satellite travelling direction (opposite direction of arrows in FIGS. 4 and 5).

The former is achieved by increasing a correction parameter δt by n times of a predicted time interval ΔT from −δte to +δts so that every $n^{th}$ forecast value in forward order is corrected. The search time in this case results in (δts+δte)/n.

The latter is achieved by decreasing a correction parameter δt by n times of a forecast time interval ΔT from +δte to −δts so that every $n^{th}$ forecast value in reverse order is corrected. The search time in this case results in (δts+δte)/n.

The maximum value of n is determined by tradeoffs between antenna beam width and the relative satellite travelling speed and the lock-on time of a tracking receiver. Thus, the reduction of the search time is limited. Since the relative satellite travelling speed is increased in the latter method, n cannot be larger in comparison with the former method.

While the displaced time/corrected time amount δt is positive here in order to accelerate the predictions, it may be consistent with other software and be defined as negative.

Fourth Embodiment

Detecting Optimum Value of Correction Parameter and Automating Predicted Value Correction Utilization of Antenna Angle Error Signal Once the tracking receiver lock-on is determined through the horizontal or orbital plane search, an antenna tracking error signal (antenna angle error signal: determination signal) is monitored. Then, a correction parameter δt is fixed at its minimum (or an optimum value of the correction parameter is detected), and corrections thereafter are performed (shift to a stationary tracking).

Utilization of a Receiving Level and Side-lobe Acquisition Blanking Function

Although correction sensitivity is lower, a receiving level (determination signal) of a receiver can be used instead of a tracking error signal. In this case, after the receiver lock-on is determined, a correction parameter δt is fixed at the maximum receiving level and then corrections thereafter are performed. In the determination based on a receiving level, the acquisition at the side-lobe can be avoided by determining an antenna pattern and comparing a receiving level with a standard estimate receiving level (which is organized in a database in advance).

Fifth Embodiment

Method where epoch time is used as parameter

In stead of a forecast value, an Epoch time can be used as a correction parameter in a system having an interface through orbit factors.

In this case, a correction formula is not used. Instead, an Epoch time is displaced by δt and it is applied to a general orbit prediction calculation so that a predicted value for a corresponding time is produced. The method whereby searching is performed by increasing and decreasing δt to determine a range and speed of the search is equivalent to the method by the correction of predicted values.

Sixth Embodiment

Correction Method in Another Earth Station

In this embodiment, correction is not made based on an antenna angle inherent to an earth station, but displacement is directly observed through time observation. It can be positional displacement itself of a satellite to be observed and is independent from differences in earth station. Thus, a correction parameter δt calculated based on observation at one station can be used at other earth stations around that time, which allows acquisition in accordance with a correction forecast without any searches in other earth stations.

As described above, programming operations according to this method, that is, the behavior analysis step and the search range calculation step are operated by a station monitoring control device 1, for example.

In other words, it is operated by a calculator system (station monitoring control device 1 in this embodiment) which calculates an orbit prediction from orbital factors or receives a predicted value from another system in order to send out a matching prediction value to a drive control device 2 for an antenna 6. This relationship is shown in FIG. 7.

Figure 7:
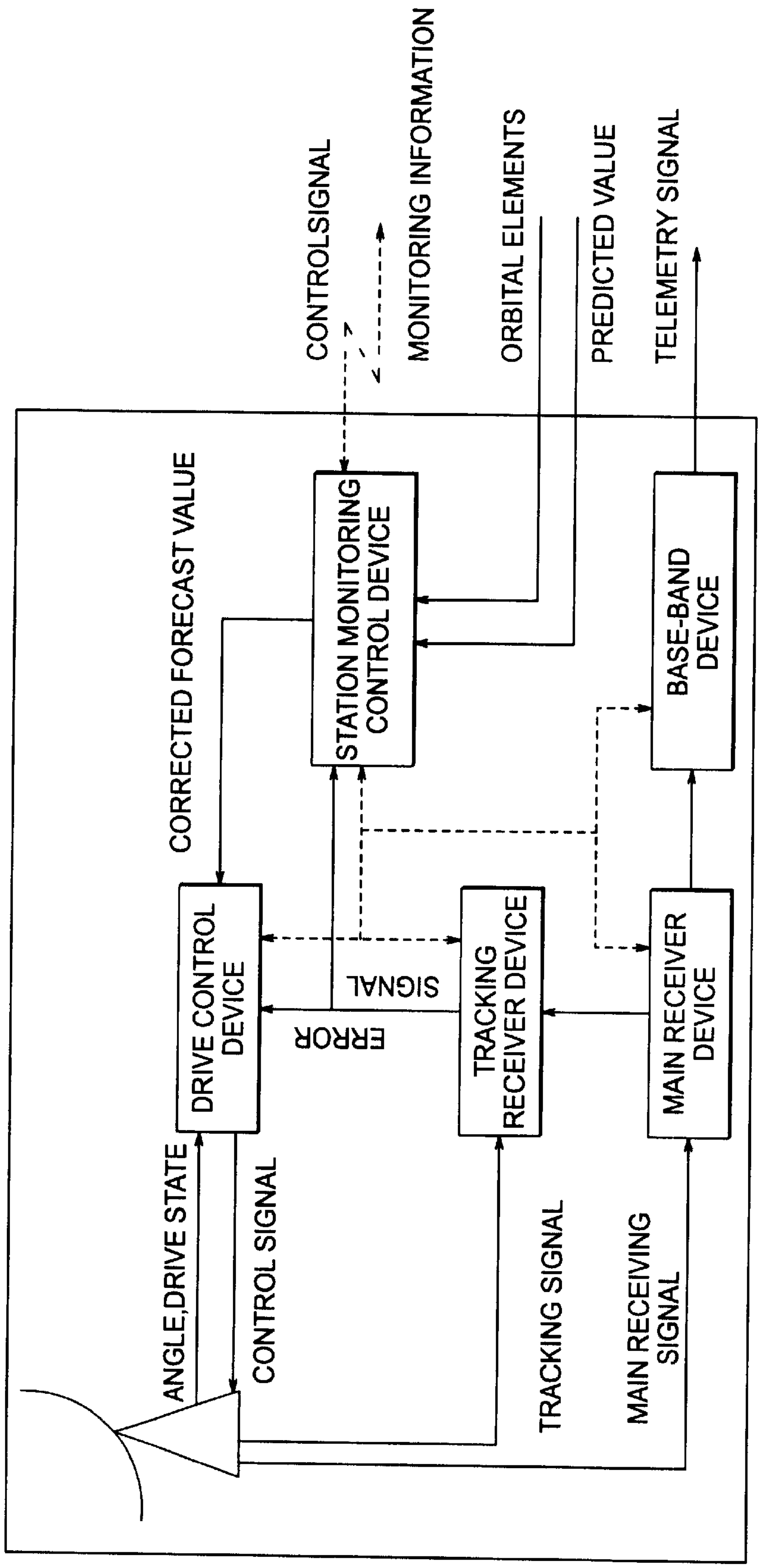
FIG. 7 is a block diagram showing an example of an information flow/system configuration.

FIG. 7 shows an example of information flow/system configuration and a facility arrangement which directly relates to the present software system implementation within the earth station system. In FIG. 7, the station monitoring control device 1 includes an antenna prediction value correction calculator function for searching for a satellite according to the present invention. The drive control device 2 drives the antenna 6 based on a corrected predicted value input from the station monitoring control device 1. In this case, the search step according to this method is performed by the drive control device 2 and the antenna 6.

A tracking receiver device 3 detects a tracking error and a receiving level based on a tracking signal received from a satellite. A main receiver device 4 converts a main receiving signal received from the satellite to a base band signal. A base band device 5 performs processing on the main receiving signal converted to the base band signal.

Seventh Embodiment

Application to Debris Observation System

Applying the present invention to a space debris observation system allows identification of an object to be observed in real time.

It is necessary to recognize an orbit accurately in order to handle space debris. Thus, observation of one path is not sufficient to calculate an orbit accurately. In order to obtain an accurate result, a cycle must be obtained and paths after a first orbit must be observed so as to verify the identification of the observed object.

According to the conventional checking method, an orbit is determined for every path so as to determine its identification based on comparison thereamong. Accordingly, it is concluded after observation, which lowers efficiency.

Using the search method according to the present invention limits the search range to a range along the observed orbit. Thus, confusing objects, such as one crossing the orbit, can be removed in real time, which increases the possibility of recovering the target object again.

EXAMPLES

First Example

Simulation based on real orbit data results.

An oval orbit, which is subject to operational failures due to large displacement, is used as an example at steady state. The simulation uses two orbit determination values, which are two weeks apart, a forecast value (around the time for obtaining an orbit data used for the determination) calculated from a subsequent determined value as a real value (reference value) in order to attempt acquisition based on a forecast value calculated from a prior determined values. Data used in the simulation are organized in Table 3.

TABLE 3

| SIMULATION DATA (STEADY STATE) | | | |
|---|---|---|---|
| MUSES-B CONTACTING ORBITAL ELEMENTS (BY NASDA NETWORK TECHNOLOGY SECTION) | | | |
| ELEMENT NO. | #125 (FORECAST) | #127 (STANDARD) | REFERENCE |
| EPOCH t | 1998/08/05 17:00:00.0 | 1998/08/19 14:00:00.0 | |
| ORBIT LENGTH RADIUS a | 17358.734771 km | 17358.397378 km | Ha: 21393 km |
| ECCENTRICITY e | 0.599756079 | 0.599843880 | Hp: 568 km |

TABLE 3-continued

| SIMULATION DATA (STEADY STATE) | | | |
|---|---|---|---|
| ORBIT SLANT ANGLE i | 31.366951 deg | 31.356399 deg | P: 379_3 mfn |
| ASCENDING NODE RIGHT ASCENSION Ω | 274.507021 deg | 265.720218 deg | a_dot: −13 m/day |
| ARGUMENT OF PERIGEE ω | 254.359364 deg | 277.940116 deg | |
| AVERAGE ANOMALY M | 257.182679 deg | 138.830445 deg | |
| EARTH STATION (ASSUMED: OKINAWA) | | | |
| LATITUDE θ | (NORTHERN LATITUDE) 25.36 deg | LONGITUDE (REFERENCE) | (EAST LONGITUDE) 126.99 deg |
| ELEVATION(EC-CENTRIC DISTANCE) | (ASSUMED) 6370 km | | |

The orbit is positioned in the Southern Hemisphere at perigee and the Northern Hemisphere at apogee. The simulation was run for a situation where a satellite flying toward the north from around latitude 10 degree South is acquired near the main island of Okinawa. Table 4 shows a result of the simulation in comparison with that according to the conventional method.

the present invention. However, according to the conventional method, this requires too much search time even through horizontal searching, which increases the possibility of failure to locate the satellite.

As an example of the situation at launch, a rapidly moving polar orbiter revolution was assumed and values specified for an H-II A rocket were used for orbiting error. Since an

TABLE 4

| SIMULATION RESULTS | | |
|---|---|---|
| [HORIZONTAL SEARCH] | | |
| WAITING ELEVATION ANGLE | PROPOSED METHOD | CONVENTIONAL METHOD |
| 0° | ENTER WITHIN A RANGE UNDER 0.1 DEGREE OF CORRECTED PREDICTED VALUE 263 SECONDS AFTER PREDICTION | ENTER WITHIN A RANGE UNDER 1.2 DEGREE OF PREDICTED VALUE 272 SECONDS AFTER PREDICTION |
| 3° | SAME AS ABOVE | ENTER WITHIN A RANGE UNDER 1.3 DEGREE OF PREDICTED VALUE 271 SECONDS AFTER PREDICTION |
| 5° | SAME AS ABOVE | ENTER WITHIN A RANGE UNDER 1.3 DEGREE OF PREDICTED VALUE 272 SECONDS AFTER PREDICTION |
| [ORBITAL PLANE SEARCH] | | |
| SEARCH ELEVATION ANGLE | PROPOSED METHOD | CONVENTIONAL METHOD |
| 0° | ENTER WITHIN A RANGE UNDER 0.1 DEGREE OF CORRECTED PREDICTED VALUE 263 SECONDS AFTER PREDICTION | MUST SEARCH 20.8 DEGREE (EL: 18.0°, Az: 10.5°) RANGE |
| 3° | SAME AS ABOVE | SUBSTANTIALLY SAME AS ABOVE |
| 5° | SAME AS ABOVE | SAME AS ABOVE |
| 10° | SAME AS ABOVE | SAME AS ABOVE |
| 15° | SAME AS ABOVE | SAME AS ABOVE |

Results were assessed differently in view of antenna sidetrack range (proportional to beam widths). For example, when an aperture was 10 m and an operational frequency was an S-band, the sidetrack angle was nearly 1°, which allowed acquisition sufficient according to the present invention. On the other hand, orbital plane search may be not possible according to the conventional method. However, if it is searched in the horizontal range, superimposing search modes to a small degree could permit its acquisition.

When the operation frequency is a Ku-band, the sidetrack angle is not more than 0.2°. It can be handled according to the present invention. However, according to the conventional method, this requires too much search time even through horizontal searching, which increases the possibility of failure to locate the satellite.

acquisition through a first revolution might fail, acquisitions through seventh and eighth revolutions when an earth station was visible again were also simulated without determining orbits.

The first revolution was along an orbit at a maximum elevation angle 8.5° from North to East with respect to the earth station. The seventh and eighth revolutions were along orbits at a maximum elevation angle 4.0° from East to North and at a maximum elevation angle 66.8° from South to North, respectively.

Orbits vary depending on how an orbiting error occurs. Thus, in this case, orbits were limited to the westernmost orbit and the easternmost orbit with respect to a nominal orbit, and the accuracy of the corrected forecast value was analyzed near at the elevation angles 0°, 3°, and 5° (In this case, the elevation angle in the seventh revolution was not high enough. Thus, only orbits near at 0° and 3° are analyzed. The analysis for the easternmost is at 0° only.)

Table 5 shows used data. Table 6 shows simulation results in comparison with those according to the conventional method. Using the present invention allowed acquisition sufficiently without superimposition of search modes if an antenna with nearly 1° sidetrack range is used. However, in the conventional method, if acquisition fails in the first revolution, acquisition in a later revolution is significantly difficult.

TABLE 5

SIMULATION DATA (AT LAUNCH)

NOMINAL ORBIT AND LAUNCHING ERROR (ASSUMED: H-II A AT POLAR ORBIT LAUNCH)

| | NOMINAL ORBIT | LAUNCHING ERROR(3σ) | WESTERN MOST ORBIT | EASTERN MOST ORBIT |
|---|---|---|---|---|
| EPOCH t | 2000/02/01 01:00:00.0 | — | 01:00:00.0 | 01:00:00.0 |
| ORBIT LENGTH RADIUS a | 6878.0 km | ±20.0 km | 6898.0 km | 6858.0 km |
| ECCENTRICITY e | 0.001 | — | 0.001 | 0.001 |
| ORBIT SLANT ANGLE i | 97.30 deg | ±0.15 deg | 97.45 deg *1 | 97.15 deg *1 |
| ASCENDING NODE RIGHT ASCENSION Ω | 94.50 deg | ±0.15 deg | 94.35 deg | 94.65 deg |
| ARGUMENT OF PERIGEE ω | 180.0 deg | — | 180.0 deg | 180.0 deg |
| AVERAGE ANOMALY M | 0.0 deg | — | 0.0 deg | 0.0 deg |

NOTE: WHEN 1: REV. 7,8 (TO NORTH), REV. 1 (TO SOUTH) IS IN OPPOSITE/NORTHERN HEMISPHERE.

EARTH STATION (ASSUMED: OKINAWA)

| | (NORTHERN LATITUDE) | LONGITUDE | (EASTERN LONGITUDE) |
|---|---|---|---|
| LATITUDE θ | 26.36 deg | (STANDARD) | 126.99 deg |
| ELEVATION(ECCENTRIC DISTANCE) | (ASSUMED) 6370 km | — | — |

TABLE 6

SIMULATION RESULTS

| REVOLUTION | PROPOSED METHOD | CONVENTIONAL METHOD |
|---|---|---|
| | [HORIZONTAL SEARCH] | |
| 1ST REVOLUTION | INCLUDED IN ORBITAL PLANE SEARCH | ENTER WITHIN A RANGE AROUND 0.3 DEGREE OF PREDICTED VALUE WITHIN ±16 SECONDS AFTER PREDICTION |
| 7TH REVOLUTION | INCLUDED IN ORBITAL PLANE SEARCH | ENTER WITHIN A RANGE AROUND 9.6 DEGREE OF PREDICTED VALUE WITHIN ±130 SECONDS AFTER PREDICTION |
| 8TH REVOLUTION | INCLUDED IN ORBITAL PLANE SEARCH | ENTER WITHIN A RANGE AROUND 2.7 DEGREE OF PREDICTED VALUE WITHIN ±180 SECONDS AFTER PREDICTION |
| | [ORBITAL PLANE SEARCH] | |
| 1ST REVOLUTION | ENTER WITHIN A RANGE UNDER 0.2 DEGREE OF CORRECTED PREDICTED VALUE WITHIN ±19 SECONDS AFTER PREDICTION | MUST SEARCH WITHIN A RANGE AROUND 3 DEGREE |
| 7TH REVOLUTION | ENTER WITHIN A RANGE UNDER 0.7 DEGREE OF CORRECTED PREDICTED VALUE WITHIN ±163 SECONDS AFTER PREDICTION | MUST SEARCH WITHIN A RANGE MORE THAN TEN DEGREE |
| 8TH REVOLUTION | ENTER WITHIN A RANGE UNDER 0.6 DEGREE OF CORRECTED PREDICTED VALUE WITHIN ±179 SECONDS AFTER PREDICTION | SAME AS ABOVE |

What is claimed is:

1. A method for acquiring a satellite by using satellite predicted values that include values of azimuth and elevation, comprising the steps of:

analyzing a behavior unique to a satellite orbit;

calculating a search range based on said analysis; and searching said search range in accordance with said predicted values.

2. A method for acquiring a satellite according to claim 1, said satellite being an artificial satellite, said step for analyzing a behavior comprising the step of analyzing a behavior unique to an orbit of said artificial satellite.

3. A method for acquiring a satellite by using satellite predicted values, said satellite being a piece of space debris, comprising the steps of:

analyzing a behavior unique to a satellite orbit;

calculating a search range based on said analysis; and searching said search range in accordance with said predicted values.

wherein said step for analyzing a behavior comprising the step of analyzing a behavior of an orbit of said space debris.

4. A method for acquiring a satellite by using satellite predicted values, comprising the steps of:

analyzing a behavior unique to a satellite orbit;

calculating a search range based on said analysis; and searching said search range in accordance with said predicted values, wherein said predicted values are corrected in consideration of movement of an earth station due to the earth's rotation.

5. A method for acquiring a satellite by using satellite predicted values, comprising the steps of:

analyzing a behavior unique to a satellite orbit;

calculating a search range based on said analysis; and searching said search range in accordance with said predicted values, wherein a search range and a search speed are determined arbitrarily by using a corrected time amount used for correction calculation of said predicted values as a parameter for said search.

6. A method for acquiring a satellite according to claim 5, said search comprising horizontal and orbital plane searches within said search range.

7. A method for acquiring a satellite according to claim 5, further comprising the steps of:

using a corrected time amount as a parameter for a correction calculation;

detecting an optimum value of said parameter; and fixing said parameter to said optimum value after a determination signal reaches to a predetermined value.

8. A method for acquiring a satellite according to claim 7, further comprising the steps of:

using an antenna angle error signal as said determination signal; and fixing said parameter to said optimum value after said antenna angle error signal is at minimum.

9. A method for acquiring a satellite according to claim 7, further comprising the steps of:

using a receiving level of a receiver as said determination signal; and fixing said parameter to said optimum value after said antenna angle error signal is at maximum.

10. A method for acquiring a satellite according to claim 5, further comprising the steps of:

sending said calculated parameter for correction calculation to another earth station, which in turn corrects said predicted value by using said received parameter so as to search for the artificial satellite.

11. A method for acquiring a satellite by using satellite predicted values, comprising the steps of:

analyzing a behavior unique to a satellite orbit;

calculating a search range based on said analysis;

searching said search range in accordance with said predicted values;

calculating orbital factors to calculate said predicted values; and using an Epoch time of said orbit factors as a parameter for correction calculation.

* * * * *